Figures 1, 2:
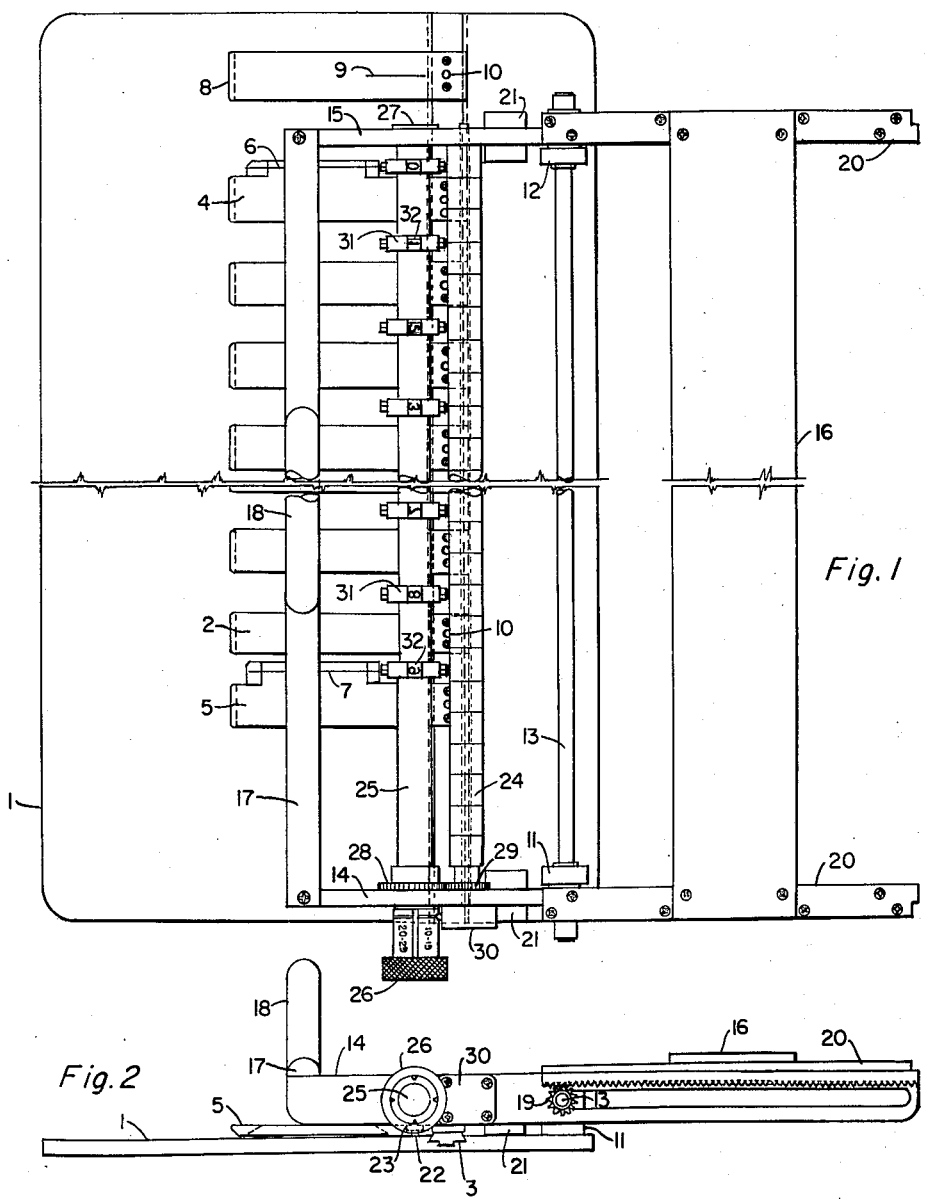

Jan. 26, 1960 W. M. MULLINGS 2,922,362
GEOPHYSICAL RECORD STAMP DEVICE
Filed May 15, 1958 2 Sheets-Sheet 1

ATTEST:
Charles F. Steininger

INVENTOR.
BY William M. Mullings.

Jan. 26, 1960

W. M. MULLINGS 2,922,362

GEOPHYSICAL RECORD STAMP DEVICE

Filed May 15, 1958

2 Sheets-Sheet 2

ATTEST:
Charles F. Steininger

INVENTOR.
William M. Mullings.
BY

2,922,362
GEOPHYSICAL RECORD STAMP DEVICE

William M. Mullings, Garland, Tex., assignor to The Atlantic Refining Company, Philadelphia, Pa., a corporation of Pennsylvania Application May 15, 1958, Serial No. 735,557

8 Claims. (Cl. 101—95)

This invention relates to apparatus for printing timing information on a seismic record. More particularly, it relates to portable apparatus for printing consecutive numbers adjacent the timing lines on a seismic record sheet.

In the seismic art it is common practice to record seismic waves on photographic paper strips by light beams from oscillograph elements. Since the travel time of the seismic wave is the fundamental quantity measured in seismic prospecting, it is necessary to provide reliable timing marks on the seismic record. Present instruments nearly all use a timing line which goes entirely across the record. Printing of this line is generally controlled by a shutter or rotating disc which periodically passes flashes of light across the record. The shutter speed is usually controlled by a carefully calibrated, electrically-driven tuning fork, commonly through a motor that is synchronized with the fork.

It is usual to provide an arrangement whereby the tenth-second lines are heavier than the other timing lines, so that the counting of the time intervals on the record is facilitated. Timing lines are usually 0.01 second apart, which, with a recording speed of one foot per second, makes the lines about 0.1 inch apart on the record. With such recording speeds and timing lines, time intervals on the record as small as one-thousandth of a second may be read.

Heretofore, in order to efficiently interpret seismic records, it has been necessary to tediously hand number at least the tenth-second lines in consecutive order. This operation is very expensive, not only because of the labor involved, but also because the nature of the work is conducive to counting errors on the part of the operator. Prior number stamping devices have not been suitable for numbering the timing lines of a seismic record due to their expense and their failure to eliminate counting errors on the part of the operator.

Accordingly, it is the main object of this invention to provide a stamping device for printing consecutive numbers adjacent the timing lines on a seismic record.

Another object of this invention is to provide a stamping device for printing consecutive numbers adjacent the timing lines on a seismic record which is relatively simple and inexpensive both in construction and operation.

A further object of this invention is to provide a stamping device for printing consecutive numbers adjacent the timing lines on a seismic record wherein the possibility of counting errors is substantially eliminated.

Other objects and advantages of this invention will become apparent from the following description taken in connection with the accompanying drawings.

Figure 3:
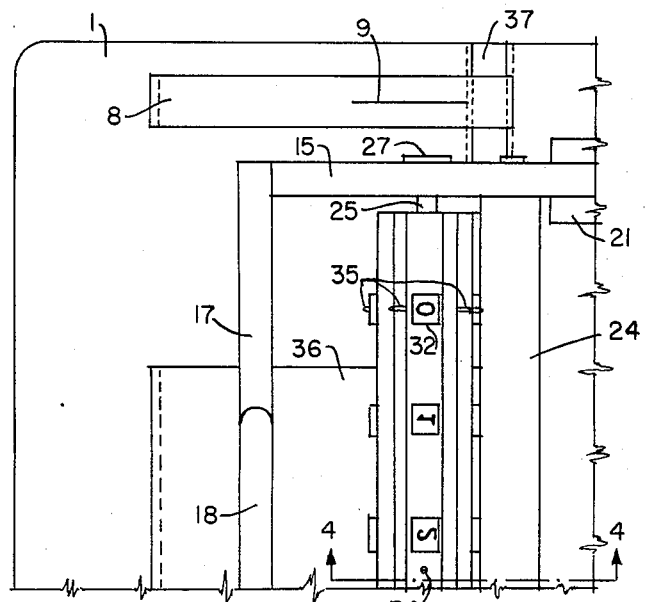
Figure 4:
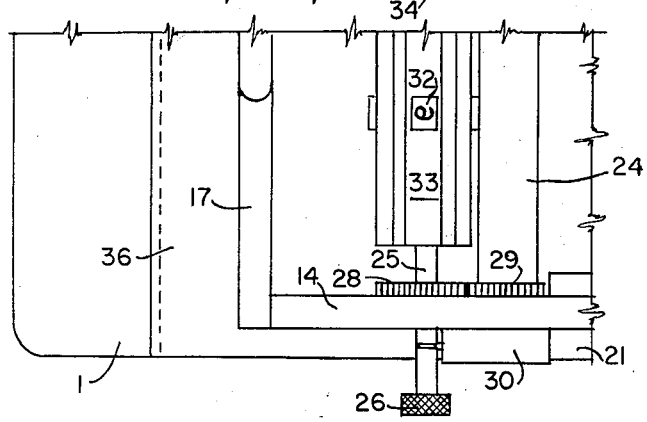
Figure 4:
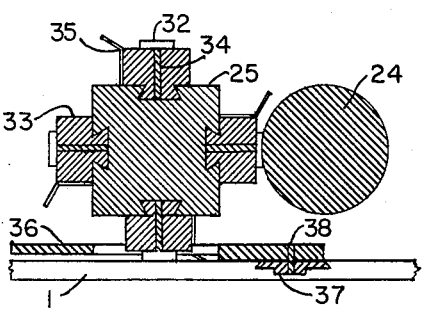

In the drawings, Figure 1 is a plan view of the preferred seismic record stamping device of the present invention, Figure 2 is a side elevation view of the seismic record stamping device of Figure 1, Figure 3 is a plan view of the front portion of the record stamping device of Figure 1 showing a modified type carrying arrangement, and Figure 4 is an enlarged, partial section taken across line 4—4 of Figure 3.

The objects and advantages of this invention are accomplished by providing a stamping device comprising a base member adapted to support a seismic record sheet, a printing arm assembly resiliently biased away from the base and carrying a plurality of type blocks adapted to contact a seismic record mounted on the base when the biasing means are compressed, and guide means mounted on the base member parallel to the plurality of type blocks and adapted to guide the seismic record transversely across the base member.

Referring specifically to the preferred embodiment shown in Figures 1 and 2 of the drawings, the entire apparatus is mounted upon and supported by base plate 1. Base plate 1 is preferably sufficiently large and massive to lend stability to the entire structure. In addition, base plate 1 also serves as a platen upon which the seismic record sheet is positioned during the stamping operation.

A plurality of longitudinally adjustable guide members 2 are mounted on base plate 1. These guide members may be composed of a transparent substance with at least some degree of resiliency, for example, plastics such as polystyrene, and are of a generally oblong shape having one end beveled to facilitate the insertion of the seismic record (not shown) between guide members 2 and base plate 1. The other end of each of the guide members is drilled so that they may be bolted to mounting brackets 3. It is preferable that additional guide members 4 and 5 be positioned on each end of the assemblage of guide members 2. Guide members 4 and 5 are similar to guide members 2; but, in addition, they are provided with scribed lines 6 and 7, respectively, so that the timing lines on the seismic record sheet may be aligned therewith. This not only furnishes a convenient means for aligning the timing lines with the type blocks but, after guide members 4 and 5 have been adjusted for a particular recording speed, it provides a convenient means of indicating seismic records which vary from that speed. Guide member 8 is also very similar to guide members 2 and bears scribed line 9. Guide member 8 is to the left of guide member 4 and should be adjusted, taking into account the recording speed of the seismic record, so that when the timing line adjacent the largest number just printed is aligned with scribed line 9, the numbers about to be printed will be in the proper position on the seismic record without the necessity of counting timing lines. This feature substantially eliminates the possibility of the operator making counting errors. It is preferable that all of guide members 2, 4, 5, and 8 be constructed with a cutout on their under sides which will be directly over that area of the seismic record sheet on which numbers are to be printed. This allows the record sheet to be moved longitudinally without smearing any freshly printed numbers.

As hereinbefore mentioned, guide members 2, 4, 5, and 8 are drilled at one end so that they may be bolted to mounting brackets 3. One mounting bracket 3 is provided for each guide member. Mounting brackets 3 are wedge shaped and designed to fit snugly in a corresponding groove formed in base plate 1. Mounting brackets 3 and the groove in base plate 1 are so devised that mounting brackets 3 are longitudinally slideable in the groove but may not be removed, except from the ends of the groove. Mounting brackets 3 may be locked against movement in the groove by tightening headless set screws 10 against the bottom of the groove. Thus, it is apparent that guide members 2, 4, 5, and 8, which are bolted to guide members 3, are easily adjustable to accommodate many different types of seismic record sheets.

Posts 11 and 12 are fixedly attached to the rearward portion of base plate 1, as by welding, and contain bearings for supporting shaft 13 which in turn supports the rocker assembly of the device. Shaft 13 extends through the bearings in posts 11 and 12 and arm members 14 and 15. Arm members 14 and 15 are held in the proper spaced apart relationship by brace plate 16 and bar 17, which may be fastened to arm members 14 and 15 by machine screws, or the like. Since arm members 14 and 15 are provided with slots through which the ends of shaft 13 extend, it will be apparent that, by means of handle 18 attached to bar 17, arm members 14 and 15 may be simultaneously shifted transversely across the surface of base plate 1 as well as pivoted up and down with respect to base plate 1. In the preferred embodiment of the instant invention, the structure which includes arm members 14 and 15, brace plate 16, and bar 17 is prevented from moving askew with respect to base plate 1 by mounting a pinion gear 19 on each end of shaft 13 in any suitable maner such as by set screws. The teeth of pinion gears 19 are meshed with corresponding teeth of rack gears 20, which are rigidly fastened to arm members 14 and 15. Hence, it is obvious that once the apparatus has been correctly adjusted, the problem of skewness will have been eliminated. It is obvious that pinion gears 19 and rack gears 20 may be eliminated and bar 13 may be formed in a manner such that it will frictionally slide in the elongated slots in arms 14 and 15.

Any convenient means may be provided for biasing arm members 14 and 15 away from base plate 1, for example, a block of resilient material 21 may be placed between each of arm members 14 and 15 and base plate 1 or a compression spring could be used. Adjustable means, such as screw 22 and jam nut 23, are also provided for limiting the movement of arm members 14 and 15 toward base plate 1.

Bearings are provided in arm members 14 and 15 for rotatably mounting inking roller 24 and shaft 25. Shaft 25 extends through arm member 14 for a short distance so that knob 26 may be rigidly mounted thereon with set screws or the like. The other end of shaft 25 is supported by the bearing in arm member 15. End plate 27 is secured to arm member 15 to control the thrust of shaft 25. Rotary motion is transferred from shaft 25 to inking roller 24 in any desirable manner, such as by gear 28 secured to shaft 25, which engages gear 29 secured to inking roller 24. Gear 28 also helps control the thrust of shaft 25. Inking roller 24 is covered with felt or some other suitable absorbent material and is positioned so as to be parallel with shaft 25. When shaft 25 is rotated by means of knob 26, it is desirable that some type of detent action be provided whereby shaft 25 may be rotated to various preselected angular positions. In the preferred embodiment of this invention there are four preselected angular positions which allow shaft 25 to rotate 90 degrees between each detent position. This detent action may be achieved by mounting detent subassembly 30 on arm member 14 adjacent knob 26. Detent subassembly 30 includes a biasing compression spring and a steel ball which cooperate with grooves formed in knob 26 at each of the desired angular positions to produce a detent action.

A plurality of discs 31 are slideably mounted on shaft 25 between arm members 14 and 15. Discs 31 are designed to be freely adjustable longitudinally along shaft 25 and positively positioned angularly with respect to said shaft. This may be achieved by the use of appropriate keys and keyways or by set screws. Means, such as set screws, are also provided for locking discs 31 in position after they have been adjusted longitudinally along shaft 25. Discs 31 may be circular, octagonal, or the like, in cross section, and are preferably fabricated as a circular disc with four flat surfaces formed on the circumference thereof. Each of these surfaces should be perpendicular to the adjacent surfaces. Type blocks 32 are mounted, as by gluing, on each of the flat surfaces of each of discs 31. Conventional type blocks with numbers cut in relief on their tops may be used, but rubber stamp numbers are preferred. Type blocks 32 are so spaced around the circumference of discs 31 and discs 31 are so arranged on shaft 25 that the numbers zero through nine may be printed on a record sheet positioned on base plate 1 with one angular position of shaft 25; ten through nineteen with the next position; twenty through twenty-nine with the next position; and thirty through thirty-nine with the last angular position of shaft 25. The detent action is adjusted to conform to these angular positions, and symbols may be engraved on knob 26 to indicate to the operator which angular position shaft 25 occupies at any time. In order to facilitate alignment of discs 31 with timing lines on the seismic record, guide members 2 may be similar in design to guide members 4 and 5 and carry scribed lines. In this variation, guide members 2, 4, and 5 may be provided with upstanding lugs which will cooperatively engage discs 31 so that relative movement of either the disc or the guide member will result in equivalent movement of the other; and, when the scribed lines on the guide members are in line with the appropriate line on the seismic record, the type block on the corresponding disc will be properly positioned directly on the appropriate timing line on the seismic record.

In operation, a seismic record sheet, not shown, is positioned on base plate 1 and slipped underneath guide members 2, 4, 5, and 8 until the upper edge of the seismic record sheet is in contact with mounting brackets 3. The seismic record sheet is then moved longitudinally until the timing line on the record sheet which is to be designated zero is in alignment with scribed line 6. If the apparatus has been adjusted for the particular record speed of the seismic record sheet, then it will be noted that scribed line 7 is in alignment with the timing line which is to be designated nine. If this is not the case, the operator should adjust discs 31 along shaft 25 until each disc is in alignment with the desired timing line, for example, the tenth-second lines. Guide members 4 and 5 should be adjusted so that scribed lines 6 and 7 are in alignment with their corresponding discs; and guide member 8 should be adjusted so that scribed line 9 is in alignment with the proper timing line, for instance, the tenth-second line preceding the timing line which is to be designated 0. Shaft 25 should then be rotated, by means of knob 26, to the angular position whereby type blocks 32 having formed thereon the numbers zero through nine are facing the seismic record sheet. Since shaft 25 is geared to inking roller 24, type blocks 32 will be freshly inked as shaft 25 is rotated.

In order to perform the stamping operation, the operator depresses handle 18, thus pivoting the rocker assembly about shaft 13 against the force of resilient material 21, until screw 22 contacts base plate 1. Screw 22 should be adjusted so that it allows the stamping assembly to be depressed until the numbers cut in relief on type blocks 32 are in firm contact with the surface of the seismic record sheet. Upon releasing handle 18, resilient material 21 will raise the rocker assembly from the surface of the record sheet. It will be appreciated that numbers may be printed near the top or bottom of the record sheet by merely moving the rocker assembly transversely with respect to base plate 1. After the first series of numbers have been printed, the record sheet is moved longitudinally until the timing line adjacent the last printed number, which in this instance is nine, is aligned with scribed line 9. Next shaft 25 is rotated to the angular position whereby type blocks 32 having formed thereon the numbers ten through nineteen are facing the seismic record sheet, and handle 18 is again depressed. It is apparent that additional consecutive numbers may be printed adjacent timing lines on the seismic record sheet by repeating the above operations as desired.

It is obvious that disc 31, having the lowest numbers of a series formed on its type blocks 32, and guide member 4 should be maintained in a fixed position as a reference point when adjustments of remaining discs 32 and guide members 2, 5, and 8 are made to accommodate records made at different recording speeds. Accordingly, these elements may be fixedly attached to their respective supports. Since the same recording speed is generally employed in a given exploration area, adjustments of discs 31 and guide members 2, 5, and 8 are necessary only when a seismic crew changes exploration areas and are thus infrequent. Accordingly, manual adjustment of these elements is usually adequate and one adjustment may be used to accommodate a multitude of records.

Although a less flexible assembly will result, the preferred assembly of Figures 1 and 2 may be modified to simplify the construction and operation thereof and the device constructed in accordance with Figures 3 and 4 of the drawings.

Referring specifically to Figures 3 and 4 where corresponding numbers refer to corresponding parts previously discussed in connection with Figures 1 and 2, the central portion of shaft 25 may be made rectangular in form rather than cylindrical. A keyway may be formed on each flat side of the rectangular portion of shaft 25 to accommodate four elongated type bars 33 carrying type blocks 32 similar to those previously referred to. These type bars may be frictionally slideable in the keyways of the rectangular section of shaft 25 so that their position with respect to base plate 1 may be adjusted. However, it is preferred that a set screw 34 passing through type bars 33 and bearing against the bottom of the keyway be employed to bind type bar 33 in position once it has been adjusted. Such adjustment of type bars 33 permits one to align type blocks 32 with appropriate timing lines on the seismic record. Such alignment is further facilitated by providing flat spring-type pointers 35 on each type bar adjacent and aligned with the lowest numbered type block. These resilient pointers 35 will contact the seismic record sheet in advance of the type block and indicate coincidence of the first number with a timing line on the seismic record; but, when further pressure is applied, metal pointers 35 will yield and permit the type blocks to contact the record.

In this modified form of the invention, by providing pointers 35 on the type bars 33, it is unnecessary to provide similar guide markers on the base plate of the stamping device. Therefore, in this variation, a single elongated guide 36 may be mounted on an elongated mounting bracket 37. Mounting bracket 37 may be longitudinally adjusted in the keyway in base member 1 and held in fixed position by set screw 38 once proper adjustment has been made. Appropriate cutouts in guide 36 permit type blocks 32 to contact the seismic record mounted between base 1 and guide 36. It is also preferred to attach to mounting bracket 37 a guide member 8 having scribed line 9 which may be coordinated with the last printed number on the seismic record sheet in order to eliminate counting errors which might occur, as was heretofore mentioned in connection with Figures 1 and 2.

It is obvious that a single printing bar 33 could be slideably mounted in keyways formed in the underside of arms 14 and 15 which bar would be replaced when each successive series of numerals is to be printed rather than mounting a plurality of printing bars on a rotatable bar, such as 25.

In either of the above variations which employ type blocks fixedly mounted on a print bar, provision can be made for different spacings between timing lines on different seismic records by providing a plurality of sets of printing bars having different spacings between their type blocks.

Having thus described my invention, it is to be understood that such description is given by way of illustration and example only and not by way of limitation, reference for the latter purpose being had to the appended claims.

I claim:

1. Apparatus for printing timing information on a seismic record sheet having appropriate timing lines printed thereon comprising a base member adapted to have said seismic record positioned thereon with said timing lines perpendicular to one axis thereof, support means mounted on said base member and movable with respect thereto in a manner such that said support means may be alternately moved toward and away from said base member, a shaft rotatably mounted on said support means parallel to said one axis of said base member, a plurality of discs slideably mounted on said shaft and adjustable axially along said shaft but fixed against angular movement about said shaft, marking indicia spaced about the periphery of said discs in a manner such that a plurality of rows of marking indicia are formed parallel to the axis of said shaft, said support means and said shaft being so positioned with respect to said base member that said marking indicia contact a seismic record sheet on said base member in one position of said support means, and inking means mounted on said support means and adapted to cooperate with said discs to supply ink to said marking indicia.

2. Apparatus in accordance with claim 1 which includes, in addition, resilient means positioned between the base member and the support means so as to normally bias said support means away from said base member.

3. Apparatus in accordance with claim 1 which includes, in addition, a guide member attached to the base member and having guide indicia thereon in a position such that a preselected timing line on the seismic sheet may be visually aligned with said guide indicia.

4. Apparatus in accordance with claim 1 which includes, in addition, at least two guide members mounted on the base member, at least said guide members being slideable parallel to the one axis of the base member, and each of which have guide indicia thereon in a position such that each of said guide indicia may be aligned with each of two preselected timing lines.

5. Apparatus in accordance with claim 1 which includes, in addition, a plurality of guide members, corresponding in number to the number of discs, mounted to slide on the base member parallel to the one axis of said base member and having guide indicia thereon in a position such that said guide indicia may be visually aligned with preselected timing lines on the seismic record sheet.

6. Apparatus in accordance with claim 5 which further includes one guide member slideably mounted on the base member in a position beyond an end disc so as to slide along the same axis as the other guide members and having guide indicia thereon in a position such that said guide indicia may be visually aligned with still another preselected timing line on the seismic record sheet.

7. Apparatus in accordance with claim 1 which includes, in addition, stop means mounted on the support means and cooperating with the shaft so as to provide a positive stop position for each row of marking indicia.

8. Apparatus in accordance with claim 1 wherein the shaft is mounted on the support means in a manner to provide for both rotation therein and relative movement perpendicular to the one axis of the base member.

References Cited in the file of this patent

UNITED STATES PATENTS

| | | |
|---|---|---|
| 893,470 | Eyer | July 14, 1908 |
| 1,448,620 | Mathiasen | Mar. 13, 1923 |
| 2,823,606 | Schafer | Feb. 18, 1958 |

UNITED STATES PATENT OFFICE
CERTIFICATE OF CORRECTION

January 26, 1960

Patent No. 2,922,362

William M. Mullings

It is hereby certified that error appears in the printed specification of the above numbered patent requiring correction and that the said Letters Patent should read as corrected below.

Column 3, line 18, for "maner" read -- manner --; column 6, line 34, for "seismic sheet" read -- seismic record sheet --.

Signed and sealed this 9th day of August 1960.

(SEAL)
Attest:

KARL H. AXLINE
Attesting Officer

ROBERT C. WATSON
Commissioner of Patents